(No Model.)

G. A. & J. E. KLOTZ.
DEVICE FOR GUIDING TRACTION ENGINES.

No. 363,246. Patented May 17, 1887.

WITNESSES:

INVENTORS

BY

ATTORNEY

UNITED STATES PATENT OFFICE.

GEORGE A. KLOTZ AND JOHN E. KLOTZ, OF CANTON, OHIO.

DEVICE FOR GUIDING TRACTION-ENGINES.

SPECIFICATION forming part of Letters Patent No. 363,246, dated May 17, 1887.

Application filed February 11, 1887. Serial No. 227,253. (No model.)

*To all whom it may concern:*

Be it known that we, GEORGE A. KLOTZ and JOHN E. KLOTZ, citizens of the United States, residing at Canton, in the county of Stark and State of Ohio, have invented certain new and useful Improvements in Devices for Guiding Traction-Engines; and we do hereby declare that the following is a full, clear, and exact description of the same, reference being had to the annexed drawings, making a part of this specification, and to the letters and figures of reference marked thereon, in which—

Figure 1:
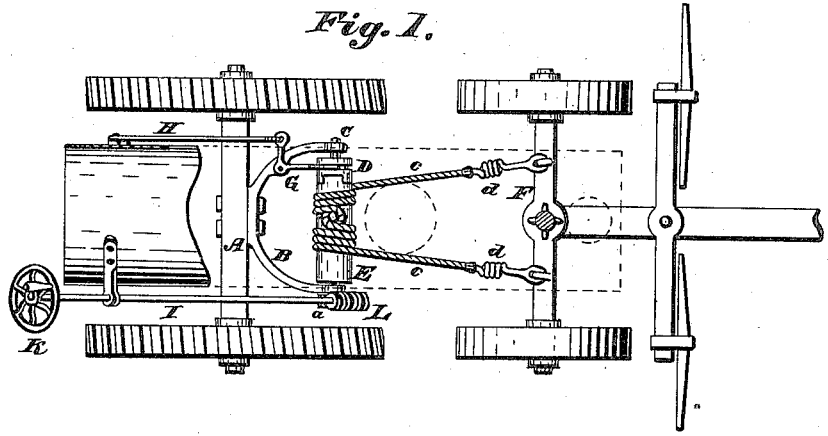
Figure 3:
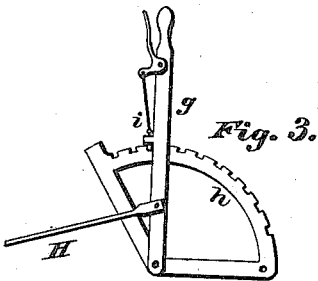
Figure 2:
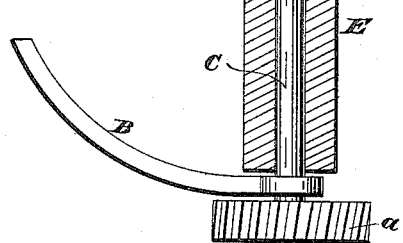

Figure 1 is a top view of a traction-engine, showing the general arrangement of the guiding mechanism. Fig. 2 is a detached view of the roller, shaft, clutch, operating-lever, screw-wheel, and the bearings for the shaft. Fig. 3 is a detached view of the lock-lever and segment.

The present invention has relation to devices calculated and designed to guide traction-engines; and its nature consists in the different parts and combination of parts, hereinafter described, and particularly pointed out in the claim.

Similar letters of reference indicate corresponding parts in all the figures of the drawings.

In the accompanying drawings, A represents the rear axle, which is constructed in the ordinary manner. To the rear axle, A, may be securely attached the yoke B, which yoke forms the bearings for the shaft C; or in place of the yoke B, brackets may be attached to the boiler to form bearings for the shaft C. To one end of the shaft C is securely attached, in any well-known manner, the screw-wheel $a$, and to the opposite end of the shaft C is attached the clutch D, said clutch being so arranged and adjusted that it will move back and forth a short distance on the shaft C, for the purpose hereinafter described.

On the shaft C is loosely mounted the roller E, said roller being provided with the notches $b$, which are for the purpose of engaging the projections $b'$, when it is desired to communicate motion to the roller E. To the roller E are attached the cables or chains $c\ c$, said cables or chains being so arranged that when one of the cables is being wound upon the roller E the other cable or chain will unwind. The front or forward ends of the cable or chains $c\ c$ are securely attached to the front or forward axle, F, substantially as shown in the drawings. The cables or chains $c\ c$ are each provided with the springs $d\ d$, which are for the purpose of taking up the slack and holding the cables or chains firm on the roller E. The clutch D is provided with the annular groove $e$, which is for the purpose of receiving the arms $f$. These arms are preferably formed integral with the lever G.

To the lever G is attached the rod or bar H, which extends to the rear end of the engine, and to the rear end of this rod or bar H is pivotally attached the operating lever or handle $g$. This operating lever or handle $g$ is provided with the catch-bar $i$, which is for the purpose of engaging the notches in the segment $h$, thereby securely holding the clutch D in the desired position. The segment $h$ is securely attached to the side of the boiler or other convenient place.

The operating lever or handle $g$ is for the purpose of throwing the roller E in and out of gear by means of the clutch D. The shaft I may be located substantially as shown in the drawings, and is provided with the hand-wheel K. The shaft I is also provided with the screw L, which meshes into the screw-wheel $a$, and is for the purpose of communicating rotary motion to the roller E when the clutch D is engaged with the roller.

It will be seen that by means of the clutch D, the rod or bar H, and the operating lever or handle $g$ the roller E can be thrown in and out of gear at will, thereby saving the trouble of detaching the cables or chains $c\ c$ from the front axle when it is desired to guide the engine by horses. It will be understood that when horses are not attached the tongue is to be held in an elevated position by means of a chain attached to the forward end of the engine proper.

Having now fully described our invention, what we claim as new, and desire to secure by Letters Patent, is—

The combination of the roller E, loosely mounted on the shaft C, and having attached thereto the cables or chains c c, adapted to wind in opposite directions, the clutch D, and means for operating the same, the screw-wheel
5 a, screw L, shaft I, and hand-wheel K, substantially as and for the purpose specified.

In testimony that we claim the above we have hereunto subscribed our names in the presence of two witnesses.

GEORGE A. KLOTZ.
JOHN E. KLOTZ.

Witnesses:
THOS. P. CORDREY,
FRED W. BOND.